US010072584B2

(12) United States Patent
Thomas et al.

(10) Patent No.: US 10,072,584 B2
(45) Date of Patent: Sep. 11, 2018

(54) MULTI-BYPASS STREAM GAS TURBINE ENGINE WITH ENLARGED BYPASS FLOW AREA

(71) Applicant: United Technologies Corporation, Hartford, CT (US)

(72) Inventors: Michael R. Thomas, Bloomfield, CT (US); Nathan Snape, Tolland, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 495 days.

(21) Appl. No.: 14/534,318

(22) Filed: Nov. 6, 2014

(65) Prior Publication Data

US 2015/0152789 A1    Jun. 4, 2015

Related U.S. Application Data

(60) Provisional application No. 61/911,051, filed on Dec. 3, 2013.

(51) Int. Cl.
| | |
|---|---|
| *F02K 3/077* | (2006.01) |
| *F02C 9/18* | (2006.01) |
| *F02K 3/00* | (2006.01) |
| *F02C 7/141* | (2006.01) |
| *F02C 7/32* | (2006.01) |
| *F02K 3/02* | (2006.01) |
| *F02C 7/14* | (2006.01) |
| *F02K 3/04* | (2006.01) |
| *F02C 7/18* | (2006.01) |

(52) U.S. Cl.
CPC .............. *F02C 9/18* (2013.01); *F02C 7/14* (2013.01); *F02C 7/141* (2013.01); *F02C 7/185* (2013.01); *F02C 7/32* (2013.01); *F02K 3/00* (2013.01); *F02K 3/02* (2013.01); *F02K 3/025* (2013.01); *F02K 3/04* (2013.01); *F02K 3/077* (2013.01)

(58) Field of Classification Search
CPC .. F02C 7/14; F02C 7/141; F02C 7/185; F02C 7/32; F02C 9/18; F02K 3/00; F02K 3/02; F02K 3/025; F02K 3/04; F02K 3/077
See application file for complete search history.

(56) References Cited

U.S. PATENT DOCUMENTS

| | | | |
|---|---|---|---|
| 4,080,785 | A | 3/1978 | Koff et al. |
| 4,559,784 | A | 12/1985 | Jenny et al. |
| 5,003,773 | A | 4/1991 | Beckwith |
| 8,448,446 | B2 | 5/2013 | Mons |
| 8,516,789 | B2 | 8/2013 | Kupratis |
| 2005/0150970 | A1* | 7/2005 | Beutin ............... F02C 7/141 237/12 |

(Continued)

*Primary Examiner* — Carlos A Rivera
*Assistant Examiner* — Kyle Thomas
(74) *Attorney, Agent, or Firm* — Carlson, Gaskey & Olds, P.C.

(57) ABSTRACT

A gas turbine engine comprises a first bypass flow path housing configured within the engine, radially exterior to an engine core housing, and a second bypass flow path housing configured within the engine, radially exterior to the first bypass flow path housing. An axially downstream portion of the first bypass flow path housing includes a stepwise increase in area compared with an axially adjacent upstream portion of the first bypass flow path housing, thereby defining a component placement cavity in the axially downstream portion.

16 Claims, 4 Drawing Sheets

(56) References Cited

U.S. PATENT DOCUMENTS

| | | | |
|---|---|---|---|
| 2008/0053060 A1* | 3/2008 | Olver | F02C 7/14 |
| | | | 60/226.1 |
| 2009/0169359 A1* | 7/2009 | Murphy | F02K 1/46 |
| | | | 415/115 |
| 2012/0128467 A1* | 5/2012 | Ruthemeyer | F01D 5/146 |
| | | | 415/115 |
| 2012/0144842 A1* | 6/2012 | Snyder | F01D 25/12 |
| | | | 60/785 |
| 2013/0104521 A1 | 5/2013 | Kupratis | |
| 2013/0186102 A1* | 7/2013 | Lo | F02C 7/18 |
| | | | 60/785 |

* cited by examiner

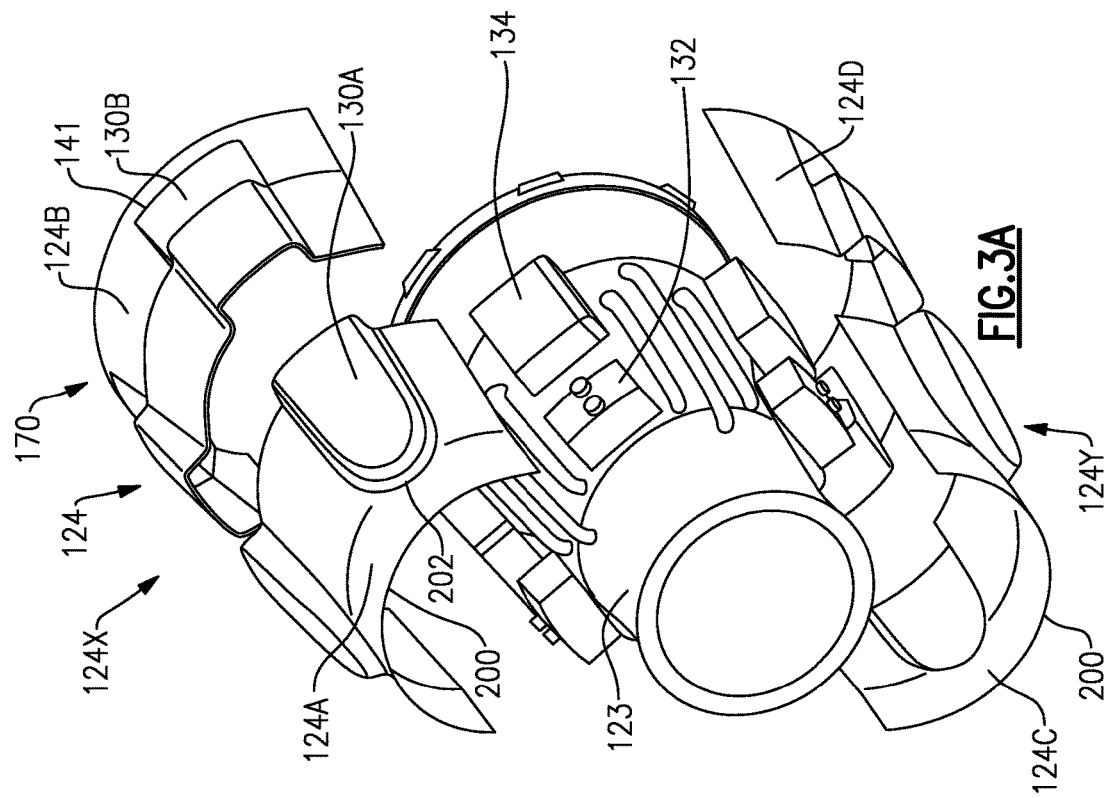
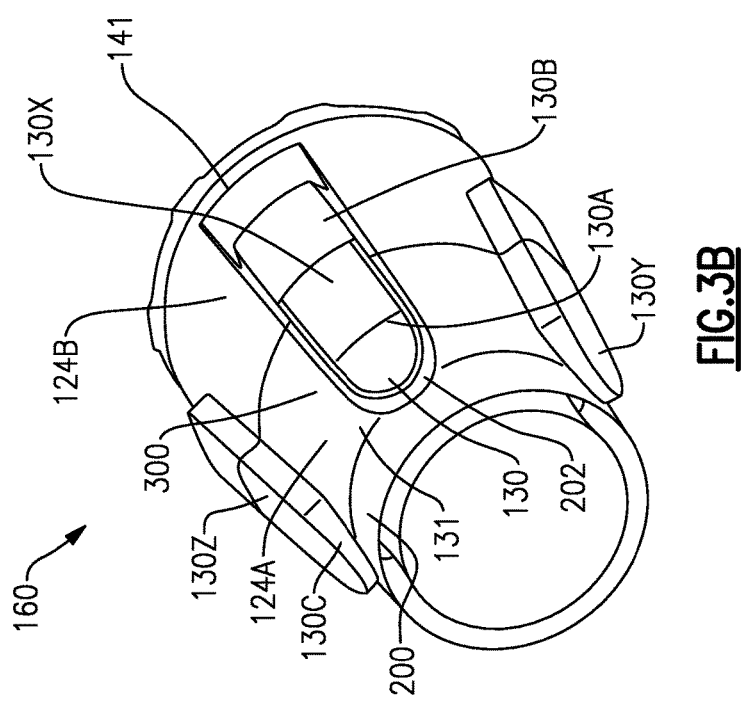

MULTI-BYPASS STREAM GAS TURBINE ENGINE WITH ENLARGED BYPASS FLOW AREA

CROSS-REFERENCE TO RELATED APPLICATION

This application claims priority to U.S. Provisional Application No. 61/911,051 filed Dec. 3, 2013.

BACKGROUND OF THE INVENTION

This application relates to a ducting arrangement for multiple bypass stream gas turbine engines.

Gas turbine engines are known and, typically, include a fan delivering air into a bypass duct as propulsion air and to be utilized to cool components. The fan also delivers air into a core engine where it is compressed in a compressor, then delivered into a combustion section where it is mixed with fuel and ignited. Products of the combustion pass downstream over turbine rotors, driving them to rotate.

One type of gas turbine engine has multiple bypass streams. Thus, there is a radially outer third stream bypass flow and a radially inner main bypass flow. Both bypass flows may be utilized for cooling heat exchangers and other components.

Historically, the main bypass flow and the third stream bypass flow have been defined by concentric housings.

SUMMARY OF THE INVENTION

In a featured embodiment, a gas turbine engine comprises a first bypass flow path housing configured within the engine, radially exterior to an engine core housing, and a second bypass flow path housing configured within the engine, radially exterior to the first bypass flow path housing. An axially downstream portion of the first bypass flow path housing includes a stepwise increase in area compared with an axially adjacent upstream portion of the first bypass flow path housing, thereby defining a component placement cavity in the axially downstream portion.

In another embodiment according to the previous embodiment, the stepwise increase in area extends only partially about a circumference of the first bypass flow path housing.

In another embodiment according to any of the previous embodiments, the first bypass flow path housing includes at least one duct which extends radially outwardly into the third stream bypass flow to define the stepwise increase in area.

In another embodiment according to any of the previous embodiments, the first bypass flow path housing includes at least one duct which extends radially outwardly into the third stream bypass flow to define the stepwise increase in area.

In another embodiment according to any of the previous embodiments, there are plurality of the ducts.

In another embodiment according to any of the previous embodiments, at least one heat exchanger is positioned radially inwardly of the duct to be cooled.

In another embodiment according to any of the previous embodiments, at least one other heat exchanger is placed in the second bypass flow path.

In another embodiment according to any of the previous embodiments, the ducts extend radially outwardly of a nominal outer surface of the first bypass flow housing at a greater rate than circumferentially intermediate portions adjacent to circumferential edges of the duct.

In another embodiment according to any of the previous embodiments, the first bypass flow housing has an upstream end. The duct extends outwardly of the nominal outer surface of the first bypass flow housing at an axial location spaced into the engine relative to the upstream end of the first bypass flow housing.

In another embodiment according to any of the previous embodiments, at least one heat exchanger is placed in the second bypass flow path housing.

In another embodiment according to any of the previous embodiments, ducts extend radially outwardly of a nominal outer surface of the first bypass flow housing at a greater rate than circumferentially intermediate portions adjacent to circumferential edges of the duct.

In another embodiment according to any of the previous embodiments, the first bypass flow housing has an upstream end. The duct extends outwardly of the nominal outer surface of the first bypass flow housing at an axial location spaced into the engine relative to the upstream end of the first bypass flow housing.

In another embodiment according to any of the previous embodiments, ducts extend radially outwardly of a nominal outer surface of the first bypass flow housing at a greater rate than circumferentially intermediate portions adjacent to circumferential edges of the duct.

In another embodiment according to any of the previous embodiments, the first bypass flow housing has an upstream end. The duct extends outwardly of the nominal outer surface of first main bypass flow housing at an axial location spaced into the engine relative to the upstream end of the first bypass flow housing.

In another embodiment according to any of the previous embodiments, an outlet from the ducts mixes with air in the third stream bypass flow outer housing.

In another embodiment according to any of the previous embodiments, an outlet for air within the stepwise increase mixes with air in the second stream bypass flow path housing.

In another embodiment according to any of the previous embodiments, at least one heat exchanger is positioned radially inwardly of the stepwise increase to be cooled.

In another embodiment according to any of the previous embodiments, at least one other heat exchanger is placed in the second bypass flow path housing.

In another embodiment according to any of the previous embodiments, the first bypass flow path housing has an upstream en. Ducts define the stepwise increase extending outwardly of a nominal outer surface of first main bypass flow path housing at an axial location spaced into the engine relative to the upstream end of the first bypass flow path housing.

In another embodiment according to any of the previous embodiments, the ducts extend radially outwardly of the nominal outer surface of the first bypass flow path housing at a greater rate than circumferentially intermediate portions adjacent to circumferential edges of the ducts.

These and other features may be best understood from the following drawings and specification.

BRIEF DESCRIPTION OF THE DRAWINGS

FIG. 3A shows an exploded view of an inner housing defining the main bypass duct.

FIG. 3B is an assembled view of the FIG. 3A components.

DETAILED DESCRIPTION

Figure 1:
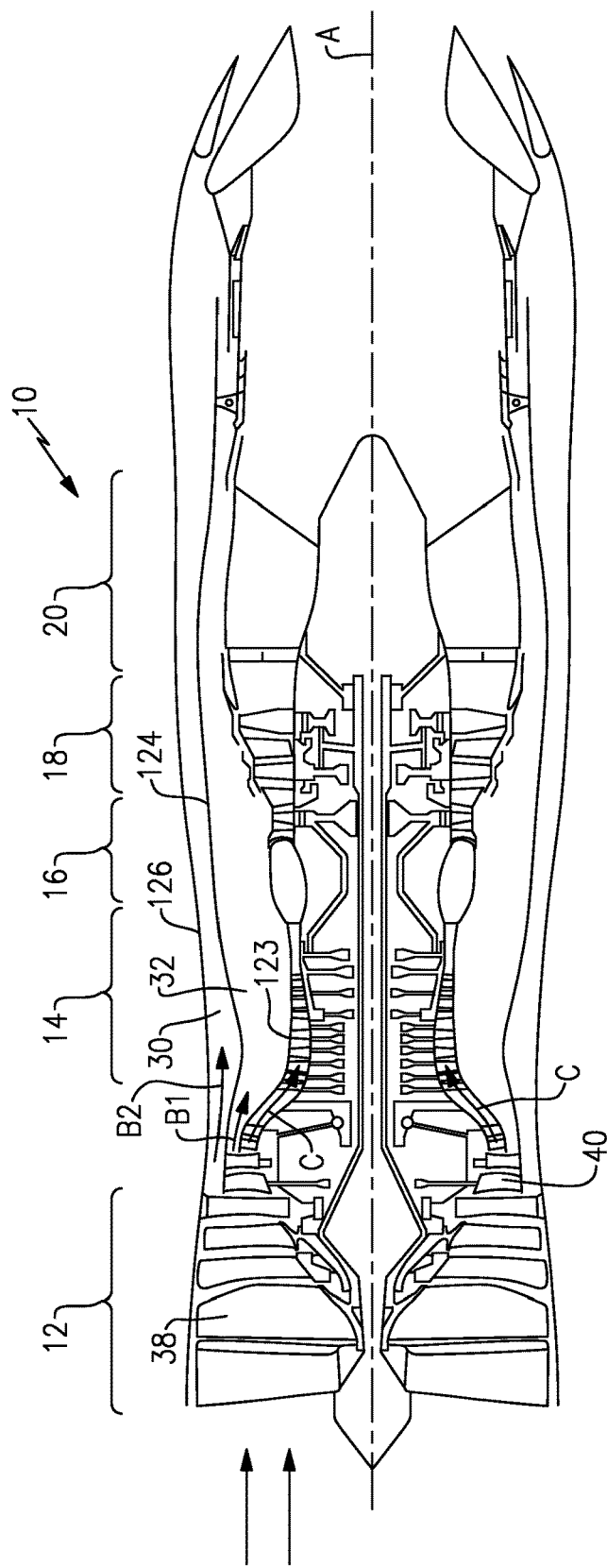
FIG. 1 schematically shows a multiple bypass stream gas turbine engine.

FIG. 1 shows an exemplary engine 10 in a schematic manner. A fan section 12 delivers air C into a core engine including a compressor section 14, a combustor section 16, a turbine section 18, and then outwardly of a nozzle 20. The air is mixed with fuel and ignited in the combustor section 16, and products of that combustion drive turbine rotors in the turbine section 18 to in turn drive compressor rotors in the compressor section 14, and further fan rotors 38 and 40.

The fan rotor 38 delivers air inwardly of a main bypass flow outer housing 124. Further, radially outwardly of the main bypass outer housing 124 is an outer housing 126. A main bypass flow B1 flows through a main bypass passage 32 inwardly of the main bypass flow outer housing 124, and outwardly of a core engine outer housing 123. A core engine flow C flows into the compressor section 14. The fan rotor 38 delivers air into the main bypass flow B1, the core engine flow C, and a third stream bypass flow B2, in a third stream bypass passage 30. The passage 30 is defined radially outwardly of the main bypass flow outer housing 124, and inwardly of the outer housing 126. A fan rotor 40 further delivers air into the main bypass flow B1, and the core engine flow C.

Figure 2:
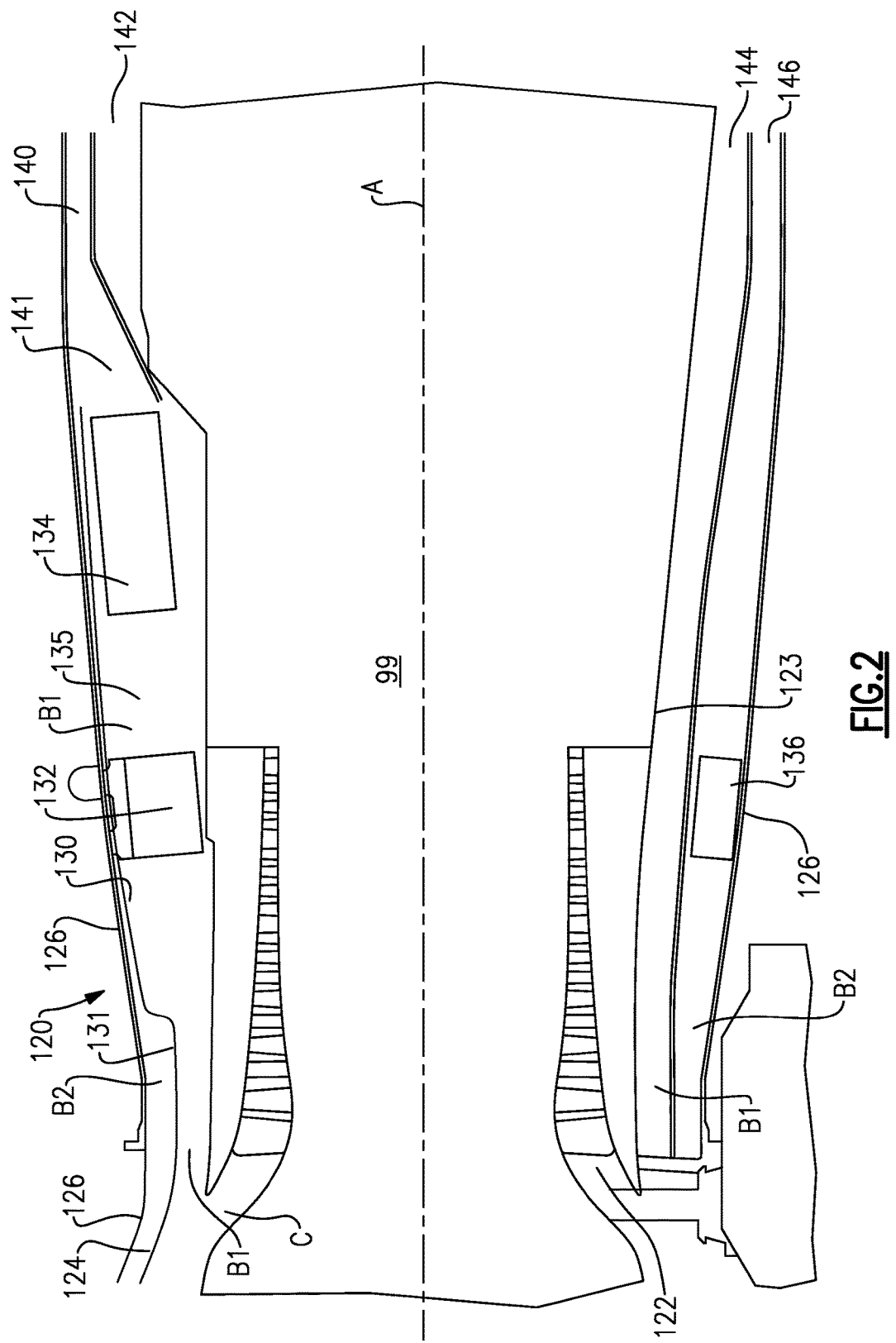
FIG. 2 shows an inventive ducting arrangement for a multiple bypass stream gas turbine engine.

An engine 120 is illustrated in FIG. 2 and may operate generally similar to the FIG. 1 known engine. The engine 120 includes a core engine flow C delivering air into the core engine 99. Core engine 99 is shown schematically but includes the sections 12, 14, 16, 18 and 20 of FIG. 1.

A main bypass flow B1 is defined between an outer core housing 123 and the main bypass flow outer housing 124. A third stream bypass flow B2 is defined between an outer surface of the housing 124 and an inner surface of an outer housing 126.

The main bypass flow B1 has radially enlarged flow areas 135 defined by ducts 130 which extend radially outwardly from a nominal surface 131 of the main bypass flow outer housing 124. The enlarged flow areas 135 defined by the ducts 130 may receive large heat exchangers such as heat exchangers 132 and 134. Radially smaller heat exchangers, such as heat exchanger 136, may be positioned within the third stream bypass flow B2. As known, the heat exchangers may carry a secondary fluid that has cooled a primary fluid, such as engine oil, and which is cooled by the bypass air.

As can be appreciated, even at locations where the ducts 130 extend radially outwardly, the outer housing 126 is still radially outward of the main bypass flow housing 124, and the ducts 130.

The duct 130 defining the enlarged flow area 135 is shown to have an outlet 141, at which air passing through the flow area 135 exits to mix with the third stream bypass flow air at 140. The remainder of the main bypass flow would be in passage 142 at this point. Thus, the air, having cooled heat exchangers 132 and 134, next passes to mix with the third stream bypass flow. Of course, the flow area 135 could outlet into passage 142.

In the past, when the main bypass flow B1 and third stream bypass flow B2 were formed to be concentric, packaging for cooling radially larger heat exchangers, such as heat exchangers 132 and 134, has proven challenging. The duct 130 addresses this challenge.

FIG. 3A shows a portion 170 of the engine 120 including the outer core housing 123, heat exchangers 132 and 134, and the main bypass flow outer housing 124. As shown, in this embodiment, the main bypass flow outer housing 124 can consist of two circumferentially spaced halves 124X and 124Y. Each of these halves includes two axially spaced halves 124A and 124B (or 124C and 124D). Each duct 130 may be defined by a first portion 130A and a second portion 130B which come together to cover the heat exchangers 132 and 134. Of course, fewer or more housing portions can be utilized.

As shown in FIG. 3B, when assembled, there are a plurality of circumferentially spaced ducts 130X, 130Y and 130Z. In this embodiment, there are three circumferentially spaced ducts illustrated (and a fourth, not shown), however, there could be other numbers such as two.

The main bypass flow outer housing portions 124A and C have an axially forward end 200 which is axially forward of an axially forward end 202 of the ducts 130. The ducts 130 axially forward end 202 extends outwardly of the nominal surface 131 of the main bypass flow housing at a greater rate than do circumferentially surrounding portions such as portions 300, which begin at circumferential edges of the ducts 130. In this manner, greater radial space is provided for packaging the heat exchangers 132 and 134, which are to be cooled.

Figure 4:
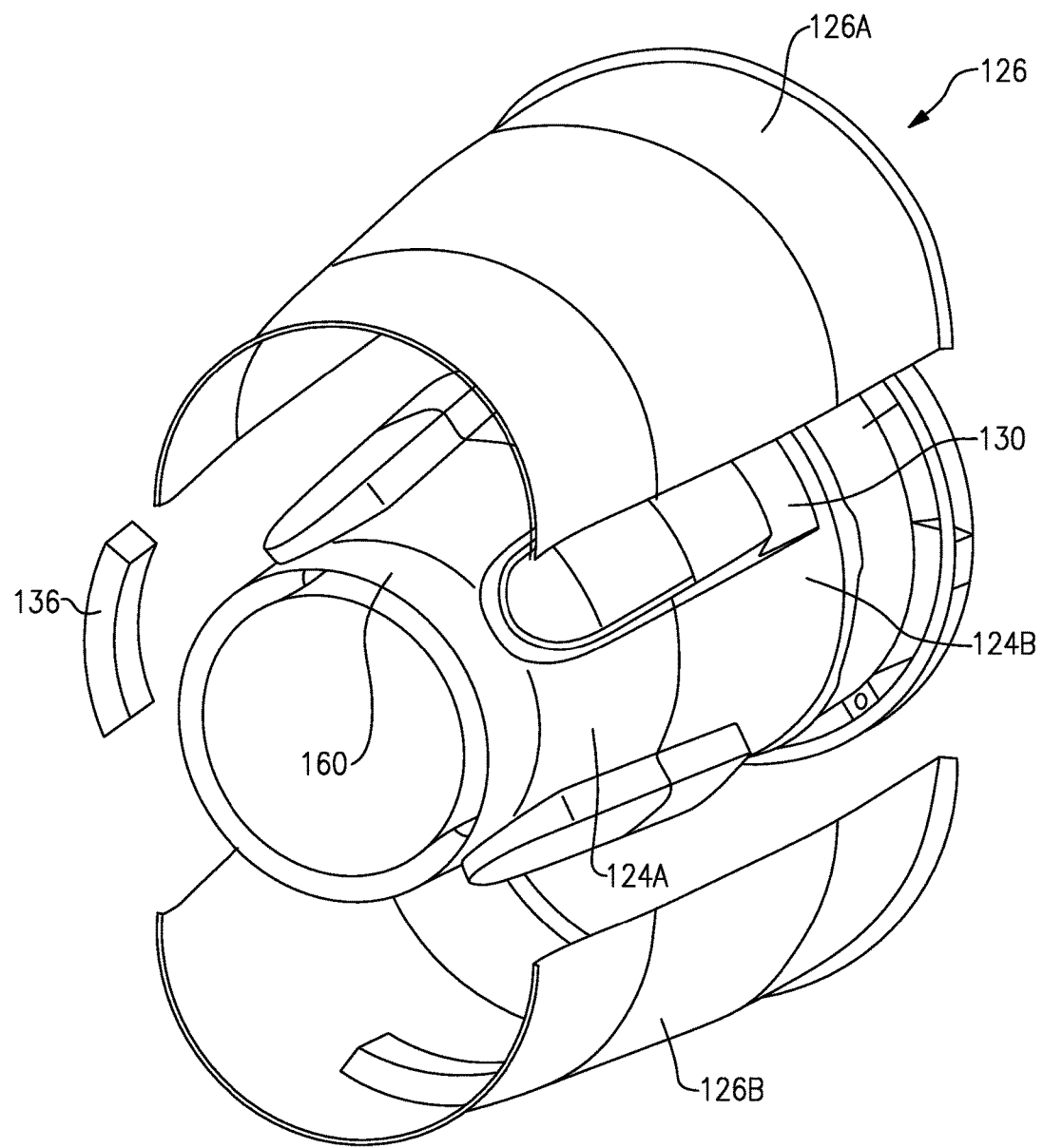
FIG. 4 shows the housing components which will define the outer bypass duct.

FIG. 4 shows the third stream bypass flow outer housing 126 and includes a pair of portions 126A and 126B surrounding the inner portion of the housing 160 such as shown in FIG. 3B.

The main bypass flow B1 could be seen as a first bypass flow path defined by a housing 124 is configured within the engine and radially exterior to an engine core housing 123. The third stream bypass flow B2 could be seen as a second bypass flow path defined by a housing 126 configured within the engine, radially exterior to the first bypass flow path housing 124. An axially downstream portion of the first bypass flow path housing 124 including a stepwise increase in area (at the duct 130) compared with an axially adjacent upstream portion of the first bypass flow path housing 124, thereby defining a component placement cavity in the axially downstream portion. As can be seen, the stepwise increase in area extends only partially about a circumference of the first bypass flow path housing 124.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a first bypass flow path housing configured within the gas turbine engine, radially exterior to an engine core housing with respect to a central longitudinal axis of the gas turbine engine, and a second bypass flow path housing configured within the gas turbine engine, radially exterior to said first bypass flow path housing with respect to the central longitudinal axis of the gas turbine engine, and a core engine flow passing radially inwardly into the engine core housing with respect to the central longitudinal axis of the gas turbine engine with a first fan rotor delivering air into said first bypass flow path housing, said second bypass flow path housing, and said core engine housing, and a second fan rotor delivering air into said first bypass flow path housing and into said engine core housing, but being radially inward of said second bypass flow path housing;

an axially downstream portion of said first bypass flow path housing including a stepwise increase in area radially outwardly with respect to the central longitudinal axis of the gas turbine engine compared with an axially adjacent upstream portion of said first bypass flow path housing, thereby defining a component placement cavity in said axially downstream portion that is circumferentially covered by a portion of the first bypass flow path housing, wherein the first bypass flow path housing includes at least one duct which extends radially outwardly with respect to the central longitudinal axis of the gas turbine engine into a flow path within said second bypass flow path housing to define the stepwise increase in area, wherein the stepwise increase of each duct of said at least one duct includes an axially forward end of the duct having an arcuate geometry that diverts air in the flow path within said second bypass flow path housing; and wherein an outlet for air within said stepwise increase in area mixes with air in the flow path within said second bypass flow path housing.

2. The gas turbine engine as set forth claim 1, wherein the stepwise increase in area extends only partially about a circumference of the first bypass flow path housing.

3. The gas turbine engine as set forth in claim 1, wherein the at least one duct is a plurality of ducts.

4. The gas turbine engine as set forth in claim 1, wherein at least one heat exchanger is positioned radially inwardly of said at least one duct.

5. The gas turbine engine as set forth in claim 4, wherein at least one other heat exchanger is placed in said flow path.

6. The gas turbine engine as set forth in claim 4, wherein said at least one duct is a plurality of ducts each extending radially outwardly of a nominal outer surface of said first bypass flow path housing at a greater rate than circumferentially intermediate portions adjacent to circumferential edges of said plurality of ducts.

7. The gas turbine engine as set forth in claim 6, wherein said first bypass flow path housing having an upstream end and said at least one duct extending outwardly of said nominal outer surface of said first bypass flow path housing at an axial location spaced into said gas turbine engine relative to said upstream end of said first bypass flow path housing.

8. The gas turbine engine as set forth in claim 1, wherein at least one heat exchanger is placed in said flow path.

9. The gas turbine engine as set forth in claim 8, wherein said at least one duct is a plurality of ducts each extending radially outwardly with respect to the central longitudinal axis of the gas turbine engine of a nominal outer surface of said first bypass flow path housing at a greater rate than circumferentially intermediate portions adjacent to circumferential edges of said plurality of ducts.

10. The gas turbine engine as set forth in claim 9, wherein said first bypass flow path housing having an upstream end and said at least one duct extending outwardly of said nominal outer surface of said first bypass flow path housing at an axial location spaced into said gas turbine engine relative to said upstream end of said first bypass flow housing.

11. The gas turbine engine as set forth in claim 1, wherein said at least one duct is a plurality of ducts each extending radially outwardly of a nominal outer surface of said first bypass flow path housing at a greater rate than circumferentially intermediate portions adjacent to circumferential edges of said plurality of ducts.

12. The gas turbine engine as set forth in claim 11, wherein said first bypass flow path housing having an upstream end and said at least one duct extending outwardly of said nominal outer surface of first bypass flow path housing at an axial location spaced into said gas turbine engine relative to said upstream end of said first bypass flow housing.

13. The gas turbine engine as set forth in claim 1, wherein at least one heat exchanger is positioned radially inwardly of said stepwise increase in area.

14. The gas turbine engine as set forth in claim 13, wherein at least one other heat exchanger is placed in said flow path.

15. The gas turbine engine as set forth in claim 1, wherein said first bypass flow path housing having an upstream end and said at least one duct defining said stepwise increase extending outwardly of a nominal outer surface of said first bypass flow path housing at an axial location spaced into said gas turbine engine relative to said upstream end of said first bypass flow path housing.

16. The gas turbine engine as set forth in claim 15, wherein said at least one duct extends radially outwardly of said nominal outer surface of said first bypass flow path housing at a greater rate than circumferentially intermediate portions adjacent to circumferential edges of said ducts.

* * * * *